United States Patent [19]
Vogel

[11] Patent Number: 5,343,247
[45] Date of Patent: Aug. 30, 1994

[54] FILTER CIRCUIT FOR PREPROCESSING A VIDEO SIGNAL TO BE CODED

[75] Inventor: Peter Vogel, Diepersdorf, Fed. Rep. of Germany

[73] Assignee: U.S. Philips Corporation, New York, N.Y.

[21] Appl. No.: 914,990

[22] Filed: Jul. 16, 1992

[30] Foreign Application Priority Data

Aug. 2, 1991 [DE] Fed. Rep. of Germany ....... 4125566

[51] Int. Cl.⁵ ............................................. H04N 7/133
[52] U.S. Cl. ..................................... 348/402; 348/607
[58] Field of Search ............... 358/105, 133, 136, 167; 379/53; H04N 7/133

[56] References Cited

U.S. PATENT DOCUMENTS

| | | | |
|---|---|---|---|
| 4,740,842 | 4/1988 | Annegarn | 358/105 |
| 4,752,826 | 6/1988 | Barnett | 358/136 |
| 4,827,338 | 5/1989 | Gerard | 358/136 |
| 5,237,413 | 8/1993 | Israelsen | 358/105 |

FOREIGN PATENT DOCUMENTS 2589020 4/1987 France .

OTHER PUBLICATIONS

Yashima et al., "Adaptive Prefiltering for HDTV Signal Coding", Proceedings of the Picture Coding Symposium, Apr. 1986, Tokyo, pp. 28-29.

Primary Examiner—Howard W. Britton
Attorney, Agent, or Firm—Michael E. Marion

[57] ABSTRACT

The video signal to be coded is coded in data blocks by a hybrid coder (4) which comprises a picture memory (410A) and a motion estimator (410B) for calculating motion vectors (v). The filter circuit comprises a multiplexer (S1) having two inputs (a1, f1) which applies either the video signal to be coded (a1) or a filtered signal (f2) to the input of the hybrid coder (4) and to the input of a further picture memory (F4). The further picture memory (F4) is arranged in the feedback path of a recursive filter (F) with which the video signal to be coded (a1) is temporally filtered. The multiplexer (S1) is controlled by a control device (S), which multiplexer receives as input data the video signal to be coded (a1), the motion vectors (v) and the data (a410) from the picture memory (410A) of the hybrid coder (4).

5 Claims, 3 Drawing Sheets

FILTER CIRCUIT FOR PREPROCESSING A VIDEO SIGNAL TO BE CODED

BACKGROUND OF INVENTION

The invention relates to a filter circuit for preprocessing a video signal to be coded. The video signal is coded in data blocks by a hybrid coder. The data of a decoded picture which is stored in a picture memory of the hybrid coder are required for filtering by the filter circuit. Motion vectors which are calculated by a motion estimator of the hybrid coder are also required.

Such a filter circuit is usable in, for example videophones, in which case this circuit is to reduce the noise originating from the video camera, because this considerably disturbs the subsequent coding by a hybrid coder.

The noise is particularly conspicuous if motion picture scenes come to a standstill, i.e. if they change into still pictures. At such a change the still picture displayed on a monitor after the decoding operation may have an unacceptably poor quality.

A coding procedure suitable for hybrid coders is described in greater detail in CCITT Recommendation H.261 (cf., for example: Draft Revision of Recommendation H.261: Video-Codec for Audiovisual Services at p*64 kbit/s. Signal Processing: Image Communication II (1990) 221–239, Elsevier Science Publishers BV). In this Recommendation the components required for implementation of the method and their functions are also described. An embodiment of a hybrid coder or decoder corresponding to the H.261 Recommendation is described in the document "Description of Reference Model 7", Specialist Group on Coding for Visual Telephony, CCITT SGXV, Working Party XV/4, Doc. 446, 1988. The first-mentioned document will hereinafter be referred to as (D1) and the second-mentioned document will hereinafter be referred to as (D2).

According to (D1) a hybrid coder consists of a source coder which comprises a quantizer, a multiplex coder which codes the main and sub-information components supplied by the source coder into binary code words and combines them to a serial data stream, and a subsequent buffer memory which is succeeded by a line coder.

A coding control means controls the source coder and the multiplex coder in dependence upon the filling level of the buffer memory.

The name hybrid coder is based on the simultaneous use of two coding principles, namely the interframe principle and the intraframe principle. In the interframe principle the time dependence of the video pictures is utilized and in the intraframe principle the local dependence within the video pictures is utilized.

If the buffer memory is about to run empty or overflow, the quantization step size (magnitude of the quantization intervals) is rendered finer or coarser in order that a larger or smaller number of data occur. The control is realised in such a way that the quantization step size remains constant within a data block of a given size (macroblock).

In this connection data block is understood to mean data of a section of a video picture. This section is, for example, a square part of the visible video picture. In (D1) (also compare EP 0 290 085 A2) four types of data blocks are distinguished:

a) Blocks consisting of 64 numerical values which either represent the luminance values of a square picture section consisting of 8×8 pixels or one of the two chrominance components of a square picture section of 16×16 pixels, b) Macroblocks consisting of four luminanee and two chrominance blocks which jointly represent all data of a square picture section of 16×16 pixels, c) Block groups consisting of 33 macroblocks, d) Video pictures consisting of 396 macroblocks each.

The term data block will hereinafter be utilized in its smaller sense according to (D1) and in its wider sense, in which the relevant picture sections may have an arbitrary size and shape.

According to (D1) a discrete cosine transform is performed with the blocks in the source coder. This leads to a bit rate reduction based on the geometrical (or rather two-dimensional) correlations which exist within a video picture and represents a concrete form of the above-mentioned intraframe principle.

The time dependence of consecutive video pictures is utilized, for example in that the difference between data of equivalent pixels of two consecutive video pictures is generated and further processed. Pixels or data blocks of video pictures which are different from each other will be referred to as equivalent if they have the same coordinates or addresses, i.e. if they have the same location within a video picture.

The positive effects of temporal filtering of video pictures on a subsequent coding operation are known from an article by Chen and Hein (Chen W. -H. and Hein D.: "Recursive temporal filtering and frame rate reduction for image coding", IEEE Journal on Selected Areas in Communication, vol. SAC-5, 1987, pp. 1155 to 1165). Temporal filtering—and only this operation is hereinafter referred to—is understood to mean a filtering operation in which the filtered data blocks are obtained from equivalent data blocks. In the article by Chen and Hein full video pictures are used as data blocks and, moreover, only a non-adaptive filtering operation is described.

SUMMARY OF THE INVENTION

It is an object of the invention to provide a falter circuit of the type described in the opening paragraph which is particularly suitable for a hybrid coder operating in accordance with the coding method described hereinbefore.

The invention comprises a filter circuit which preprocesses the video signal and applies either the video signal or a filtered version of the video signal to the input of a coder. The choice of input to the coder is controlled by a switching device which is in turn controlled by motion vectors generated during the coding of the video signal.

These and other aspects of the invention will be apparent from and elucidated with reference to the embodiments described hereinafter.

DETAILED DESCRIPTION OF THE PREFERRED EMBODIMENTS OF THE INVENTION

Figure 1:
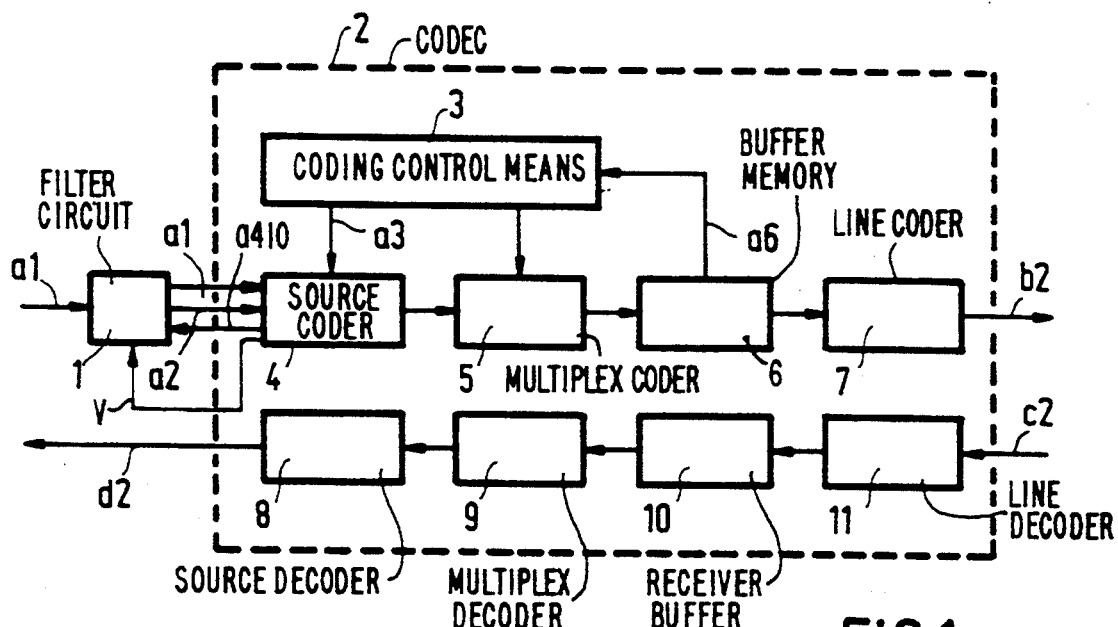
FIG. 1 is a block diagram of a codec supplemented with the circuits according to the invention.

In FIG. 1 the components within broken lines are part of a codec 2 which has all circuit and function characteristics required in accordance with (D1). The components 3, 4, 5, 6 and 7 form part of the hybrid coder of the codec 2 and the components 8, 9, 10, 11 form part of the (hybrid) decoder. Identical reference symbols will hereinafter be used for lines, connections and signals transmitted through these lines.

The component 4 is a source coder whose output data are applied to a multiplex coder 5. The multiplex coder 5, which is controlled by a coding control means 3, codes its input data in a binary manner and combines them to a serial bit stream which is continuously read into the subsequently arranged (transmission) buffer memory 6. The filling level of the buffer memory 6 is monitored by the coding control means 3 which also controls the source coder 4 with the aid of the filling level dam, particularly the quantizer of the source coder. After the digital video signal has been read from the buffer memory 6, the signal is passed on to a line coder 7 and transmitted to a receiver via a line b2.

The video data to be coded are applied in macroblocks to a filter circuit 1 according to the invention via a line a1. For its function in accordance with the invention the filter circuit 1 requires data determined by the source coder 4, as is indicated by the lines between the source coder 4 and the filter circuit 1. In accordance with (D1) and (D2) these data must also be determined without the filter circuit 1 so that the source coder 4 should not be changed. Further details about the function of the filter circuit 1 will be described hereinafter.

The video signal to be decoded is applied to the decoder 8, 9, 10, 11 via a line c2. This signal is decoded by a line decoder 11, written into a receiver buffer 10, decoded by a multiplex decoder 9 and a source decoder 8 and applied to a monitor (not shown) via a line d2.

Figure 2:
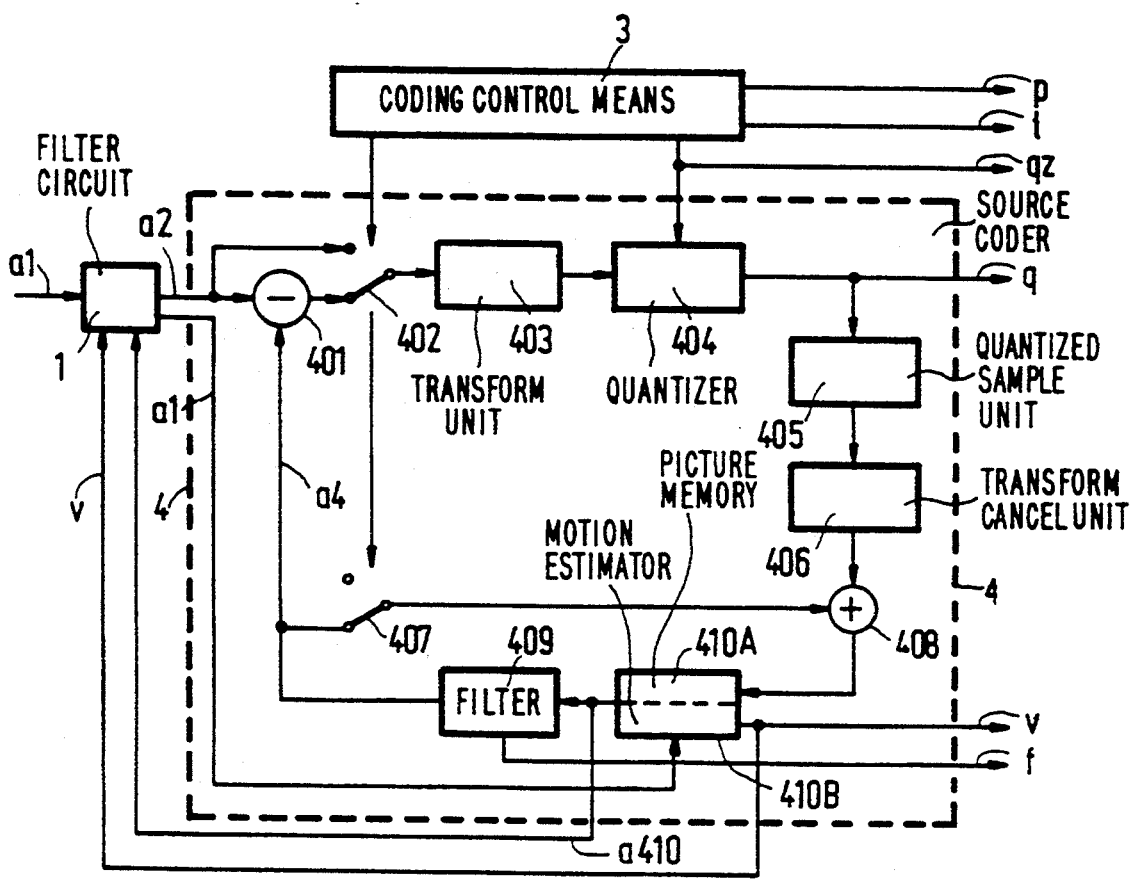
FIG. 2 shows details of the block diagram of a source coder supplemented with the circuits according to the invention.

FIG. 2 also shows a part of the codec of FIG. 1 diagrammatically, namely the source coder 4 with the coding control means 3 and the filter circuit 1. The coding control means 3 and the source coder 4 are connected to the multiplex coder 5 shown in FIG. 1 via lines p, t, qz, q, v and f. Sub-information components are transmitted via the lines p, t, qz, v and f and main information components are transmitted via the line q. Further details about the type and meaning of main and sub-information components are given in (D1).

The source coder 4 comprises a transform unit 403 and a subsequent quantizer 404. With these two components a significant pan of the bit rate reduction is achieved in a coder in accordance with the H.261 Recommendation. The output signal, which consists of quantization indices, is applied to the subsequent multiplexer 5 via the line q. A feedback loop comprises a unit 405 for gaining quantized sampling values from the quantization indices. Subsequently, the action of the transform unit 403 is cancelled by a unit 406 with the quantized sampling values. The picture decoded in blocks is stored in blocks in a picture memory 410A by means of an adder 408 and the picture memory 410A.

A subtracter 401 forms the difference between the data of an input block a2 and the data of a prediction block filtered by a filter 409 via a line a4. This difference will hereinafter be referred to as difference block. A switch 402 and a further switch 407 are controlled by the coding control means 3 in such a way that they will remain in the position shown when difference blocks are to be coded and will be switched to their second position in the other case (when directly coding the input blocks).

The falter 409 in the feedback loop of the source coder 4 may be effectively switched; the switching condition of this filter 409 is signalized by the signal f. Motion estimation is also performed by a motion estimator 410B with the aid of the picture memory 410A. This motion estimation results in the components of a two-dimensional motion vector whose data are passed on via the line v.

The motion vectors are used for the function of the filter circuit 1. The data of the reconstructed video picture stored in the picture memory 410A are also used in the form of macroblocks. Consequently, the output of the picture memory 410A is connected to the filter circuit 1 via a line a410 and the output of the motion estimator 410B is connected to the filter circuit 1 via the line v.

Figure 3:
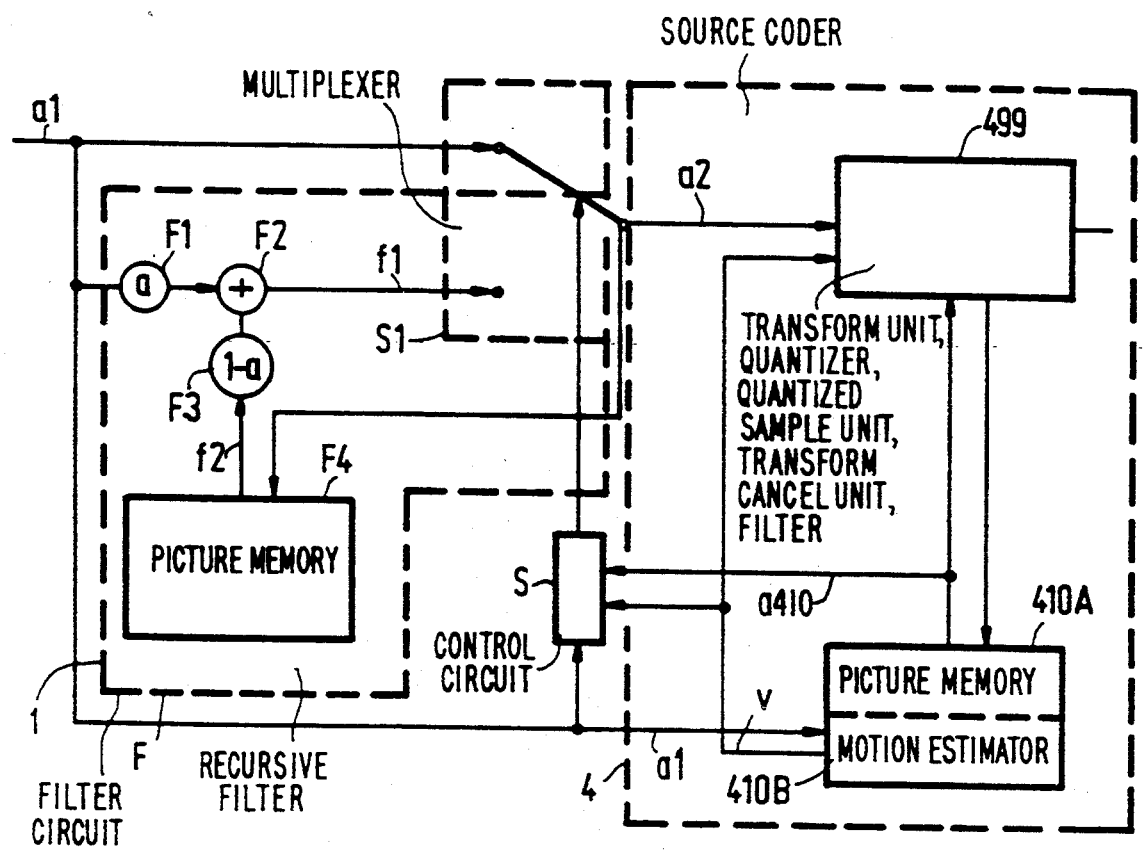
FIG. 3 shows details of the filter circuit according to the invention and FIG. 4 shows results of a simulation for a standard picture sequence.

FIG. 3 shows function units of the filter circuit 1 and their connections with the source coder 4. The explanation of the filter circuit 1 is based on the fact that all data are present in parallel and processed in macroblocks. The lines shown therefore have as many branches as a macroblock has binary data for representing all its information. Circuits providing the required clock signals and their phase relationships are not shown, because such circuit arrangements are well known to those skilled in the art.

The main components of the filter circuit 1 are a multiplexer S1 having two inputs a1 and f1, a control circuit S and a recursive filter F which is effective only in one switching position of the multiplexer S1 because the feedback path of the filter F is separated in the other switching position of the multiplexer S1.

The multiplexer S1 applies either the video signal a1 to the input of the source coder 4 or a signal f1 filtered by the filter F. The output signal a2 of the multiplexer S1 is also applied to a picture memory F4 of the filter F.

The signal a2 is delayed by one picture clock period by the picture memory F4 and applied as signal f2 to a multiplier F3 which multiplies the signal f2 by the factor 1-a. The input signal a1 is multiplied by the factor a by a further multiplier F1 of the filter F. The output signals of the multipliers F3 and F1 are added by an adder F2 and applied to an input f1 of the multiplexer S1.

The switching position of the multiplexer S1 is controlled by the control circuit S by means of a control signal. The input data of the control circuit S are the video signal a1, the reconstructed signal a410 which is delayed by one picture clock period with respect to the video signal a1, and the motion vectors v. The source coder 4 in FIG. 3 is only shown in a general outline with respect to the identical coder in FIG. 2. The components and the lines have the same reference numerals. The source coder module 499 represents a combination of all components of the source coder 4, except for the picture memory 410A and the motion estimator 410B.

In the calculation of a control signal for the multiplexer S1 the control unit S checks whether the motion vector of the current macroblock a1 is the zero vector or not.

The current macroblock is understood to mean the macroblock whose data are present at the input a1 of the circuit shown in FIG. 3 at an arbitrarily chosen point of consideration. The motion estimator 410B determines the motion vector for the current macroblock from a comparison of the current macroblock with blocks of the same size associated, however, with the reconstructed preceding picture and being stored in the picture memory 410A.

If this motion vector v is not the zero vector, the multiplexer S1 remains in the position shown in FIG. 3, i.e. the unfiltered current macroblock a1 is applied to the source coder 4 and the picture memory F4. Otherwise, the control unit S forms the difference in components between the current macroblock and the corresponding macroblock of the picture preceding by one picture clock period and being stored in the picture memory 410A of the source coder 4.

These differences are added to the absolute value $\|S\|_1$ and compared with a first threshold T1. Moreover it is checked whether the value of each component of the difference block is smaller than or equal to a threshold T2. The comparison with the threshold T2 is equivalent to the process of determining the maximum value $\|D\|_{max}$ from the components of the difference block and then compare them with the threshold T2.

The effective switching of the filter F can be represented in a formula by the logic conjunction (∧) of three conditions, namely:

$$(\|S\|_1 \leq T_1) \wedge (\|S\|_{max} \leq T_2) \wedge (V=0).$$

If all three conditions are fulfilled simultaneously, the output a2 of the multiplexer S1 is connected to the input f1; in the other case the connection applies as is shown in FIG. 3.

As is apparent, not all data of the data blocks need to be utilized for determining the two values. A limitation to the luminance values yields equally satisfactory results while using fewer computations.

Figure 4:
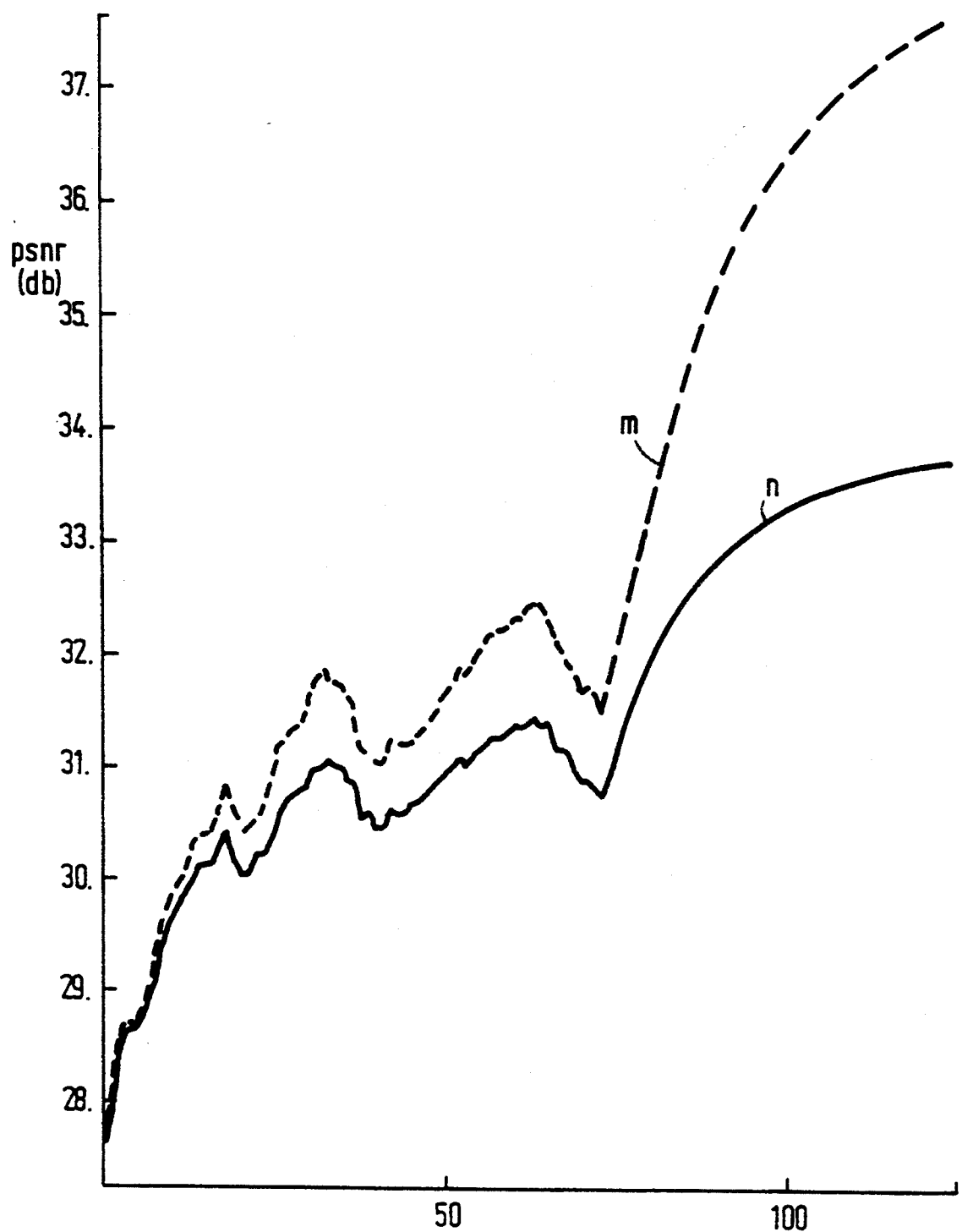

FIG. 4 shows the result of the analysis of a signal which was coded by means of a hybrid coder and subsequently decoded. The mode of functioning of the hybrid coder was simulated by a computer. The signal was coded by means of the filter circuit according to the invention (curve m) and without the filter circuit (curve n). The signal was a standard picture sequence (salesman) used in picture coding. FIG. 4 shows the numbers of the processed pictures plotted against the peak signal-to-noise ratio psnr conventional for coding which is defined by $$\mathrm{psnr} = 10 \log 255^2/\sigma^2$$

in which 255 is the highest number representing a signal value and $\sigma$ is the variation of the decoded signal.

From picture number 75 the 75$^{th}$ picture of the sequence of moving pictures is constantly repeated so that a moving picture scene changing over to a still picture is the result. Without a filter circuit the psnr curve n reaches a limit value at 34 dB after a transient time when the input signal a1 is superimposed with uncorrelated noise having a Gaussian distribution at a variation of $\sigma=5$. As regards the curve m there is already an improvement during the moving picture scene. The filter parameter a was chosen to be 0.5. The limit value reached by the curve m after the transient time is over 38 dB. The significant improvement obtained by the use of a filter circuit according to the invention can clearly be seen.

The functions of the filter circuit according to the invention as well as of the hybrid coder may be taken over completely or partly by a programmed signal processor. The following documents are available to those skilled in the art as tools for converting the function indications into programs:

[1] Fliege, N.: "Digitale Filter mit dem Signalprozessor 2920". Elektronik (1981), pp. 81 to 85 and pp. 89 to 94.

[2] Müller, K. -H.: "Echtzeitsimulation mit dem Analog-Prozessor 2920". Elektronik (1981), pp. 95 to 98.

[3] Signal Processing Algorithms. Prentice-Hall., Inc., Englewood Cliffs, N.J. 07632.

[4] Oberhofer, A.: "Zustandsregelung mit digitalen Filtern". Elektronik (1985), pp. 63 to 68.

[5] Handbooks published by Daisy Systems Corporation "Simulation Compilation". August 1988 and "Daisy Behavioral Language". September 1988.

[6] Handbook published by Data I/O Corporation, January 1989, ISDN 984-0029-002, pp. 10–28 and 10–30.

I claim:

1. An apparatus for preprocessing a video signal prior to its input to a digital coding circuit, wherein said digital coding circuit generates motion vectors as part of a digital coding process, said apparatus comprising:
   filter means for receiving as an input said video signal and for filtering said video signal so as to derive a filtered video signal, said filter means comprising switching means for switchably providing as a filter means output to said digital coding circuit, said video signal or said filtered video signal in response to a control signal; and
   control means, coupled to said digital coding circuit and said switching means, for providing said control signal in response to said motion vectors.

2. An apparatus as claimed in claim 1, wherein the filter means comprises a recursive filter with a picture memory.

3. An apparatus as claimed in claim 2, wherein the recursive filter is a first-order filter.

4. An apparatus as claimed in claim 1, wherein the digital coding circuit is a hybrid coder arranged to code the video signal or the filtered video signal in data blocks, said hybrid coder comprising a further picture memory for storing the data of a decoded video picture and a motion estimator for computing said motion vectors.

5. An apparatus as claimed in claim 4, wherein the motion vectors are provided to said filter means for deriving the control signal in accordance with predetermined criteria.

* * * * *